United States Patent
Saber et al.

(10) Patent No.: US 12,261,552 B2
(45) Date of Patent: Mar. 25, 2025

(54) METHOD FOR CONTROLLING A RECTIFIER CONNECTED TO A PERMANENT-MAGNET SYNCHRONOUS ELECTRIC GENERATOR TO PROVIDE A DIRECT VOLTAGE, CORRESPONDING DEVICE AND COMPUTER PROGRAM

(71) Applicants: SAFRAN, Paris (FR); SAFRAN ELECTRICAL & POWER, Blagnac (FR)

(72) Inventors: Christelle Saber, Moissy-Cramayel (FR); Florent Rougier, Moissy-Cramayel (FR); Adrian Florescu, Moissy-Cramayel (FR); Mallika Nadheria, Moissy-Cramayel (FR)

(73) Assignees: SAFRAN, Paris (FR); SAFRAN ELECTRICAL & POWER, Blagnac (FR)

( * ) Notice: Subject to any disclaimer, the term of this patent is extended or adjusted under 35 U.S.C. 154(b) by 370 days.

(21) Appl. No.: 17/907,612

(22) PCT Filed: Mar. 25, 2021

(86) PCT No.: PCT/FR2021/050518
§ 371 (c)(1),
(2) Date: Sep. 28, 2022

(87) PCT Pub. No.: WO2021/198594
PCT Pub. Date: Oct. 7, 2021

(65) Prior Publication Data
US 2023/0137395 A1    May 4, 2023

(30) Foreign Application Priority Data
Apr. 3, 2020 (FR) .................................. 2003370

(51) Int. Cl.
*H02P 11/04* (2006.01)
(52) U.S. Cl.
CPC .................................... *H02P 11/04* (2013.01)
(58) Field of Classification Search
CPC ................................ H02P 11/04; H02P 21/00
See application file for complete search history.

(56) References Cited

U.S. PATENT DOCUMENTS

| | | | | |
|---|---|---|---|---|
| 3,775,649 A | * | 11/1973 | Bayer | H02P 21/10 318/702 |
| 2013/0106368 A1 | * | 5/2013 | Yamashita | H02P 9/04 322/89 |

(Continued)

FOREIGN PATENT DOCUMENTS

WO    WO-2014173954 A2 * 10/2014 .......... H02M 1/4233

OTHER PUBLICATIONS

WO-2014173954-A2_translate (Year: 2014).*

(Continued)

*Primary Examiner* — Tulsidas C Patel
*Assistant Examiner* — Mohammed Ahmed Qureshi
(74) *Attorney, Agent, or Firm* — WOMBLE BOND DICKINSON (US) LLP

(57) ABSTRACT

A method for determining a first setpoint for a first vector component of the phase currents along a first axis of a rotating reference frame connected to a rotor of the electric generator, and a second setpoint for a second vector component of the phase currents along a second axis of the rotating reference frame. The second vector component of the phase currents is to bring about defluxing of the rotor; and controlling the rectifier on the basis of the first and second setpoints for the vector components of the phase currents. The first setpoint for the first vector component of the phase currents is determined on the basis of an external (Continued)

feedback loop designed to feedback-control a voltage on a DC bus or to regulate a current from a battery connected to the DC bus.

8 Claims, 9 Drawing Sheets

(56) References Cited

U.S. PATENT DOCUMENTS

2013/0335041 A1 12/2013 Baek et al.
2019/0157996 A1* 5/2019 Okubayashi ............ H02P 21/32

OTHER PUBLICATIONS

International Search Report received for PCT Patent Application No. PCT/FR2021/050518, mailed on Oct. 18, 2021, 6 pages (3 pages of English Translation and 3 pages of Original Document).

* cited by examiner

METHOD FOR CONTROLLING A RECTIFIER CONNECTED TO A PERMANENT-MAGNET SYNCHRONOUS ELECTRIC GENERATOR TO PROVIDE A DIRECT VOLTAGE, CORRESPONDING DEVICE AND COMPUTER PROGRAM

FIELD OF THE INVENTION

The present invention relates to a method for controlling a rectifier connected to a synchronous electric generator with permanent magnets to provide a direct current voltage, and to a corresponding device and computer program.

BACKGROUND OF THE INVENTION

The prior art comprises in particular the documents WO-A2-2014/173954, US-A1-2013/106368 and US-A1-2013/335041.

To control an inverter connected between an electric motor and a direct current voltage source, it is known to use an inverter control method, comprising:
  determining a first setpoint of a first vector component of the phase currents along a first axis of a rotating reference frame linked to a rotor of the electric machine, and a second setpoint of a second vector component of the phase currents along a second axis of the rotating reference frame, this second vector component of the phase currents being intended to drive a defluxing of the rotor; and
  controlling the inverter from the first and second setpoints of the vector components of the phase currents.

This known method uses a direct current voltage measurement, a torque setpoint of the electric motor and a measurement of the instantaneous rotational speed of the rotor to determine phase current setpoints in a reference frame d-q attached to the rotor. More specifically, tables are provided which give the direct current setpoint and the quadrature current setpoint respectively from the measurement of the direct current voltage, the torque setpoint and the measurement of the instantaneous rotational speed.

Furthermore, for the electric machines operating as a generator, it is known to use a method for controlling a rectifier connected to phases of the synchronous electric generator with permanent magnets to provide a direct current voltage, the phases being designed to have phase currents flowing through them when the electric generator is driven, the method comprising:
  determining a first setpoint of a first vector component of the phase currents along a first axis of a rotating reference frame linked to a rotor of the electric generator, and a second setpoint of a second vector component of the phase currents along a second axis of the rotating reference frame, this second vector component of the phase currents being intended to drive a defluxing of the rotor; and
  controlling the rectifier from the first and second setpoints of the vector components of the phase currents.

It may thus be desired to provide a control method suitable for an electric machine operating as a generator and in particular a multi-star and multi-phase machine, i.e., a machine which comprises several stars and for which each star is at least three-phase.

SUMMARY OF THE INVENTION

A method for controlling a rectifier connected to phases of a synchronous electric generator with permanent magnets to provide a direct current voltage is therefore proposed, the phases being designed to have phase currents flowing through them when the electric generator is driven, the method comprising:
  determining a first setpoint of a first vector component of the phase currents along a first axis of a rotating reference frame linked to a rotor of the electric generator, and a second setpoint of a second vector component of the phase currents along a second axis of the rotating reference frame, this second vector component of the phase currents being intended to drive a defluxing of the rotor; and
  controlling the rectifier from the first and second setpoints of the vector components of the phase currents;
  characterised in that the first setpoint of the first vector component of the phase currents is determined from an external feedback loop designed to feedback-control a voltage of a direct current bus or to regulate a current from a battery connected to the direct current bus,
  and in that the method further comprises:
  determining a first theoretical setpoint of the first vector component of the phase currents;
  determining a second theoretical setpoint of the second vector component of the phase currents; and
  if a magnitude of a vector sum of the setpoints of the vector components of the phase currents is less than or equal to a predefined threshold, providing the theoretical setpoints as setpoints of the vector components of the phase current; and
  otherwise, limiting the first theoretical setpoint and/or the second theoretical setpoint so that a magnitude of a vector sum of the theoretical setpoints is less than or equal to the predefined threshold, and providing the theoretical setpoints after limiting the vector components of the phase currents as setpoints.

Thus, with the invention, the first setpoint is determined from the external feedback loop, so that it is not necessary to know the operating characteristics of the electric machine. In particular, there is no need to use a torque setpoint of the electric machine or a measurement of the instantaneous rotational speed of the rotor, as is necessary in the known method adapted to the electric motor.

Optionally, the control of the rectifier from the first and second setpoints comprises:
  determining setpoints of phase voltages of the electric generator; and
  controlling the rectifier from the setpoints of the phase voltages;
  and the second setpoint of the second vector component of the phase currents is determined from the setpoints of the phase voltages.

Optionally, the second setpoint of the second vector component of the phase currents is set equal to a predefined constant.

Optionally, the second setpoint of the second vector component of the phase currents is determined from the first setpoint of the first vector component of the phase currents.

Optionally also, the second setpoint of the second vector component of the phase currents is determined by means of a table associating values of the second setpoint of the second vector component of the phase currents to values of the first setpoint of the first vector component of the phase currents.

Optionally also, the second setpoint of the second vector component of the phase currents is determined by means of a function associating values of the second setpoint of the second vector component of the phase currents to values of the first setpoint of the first vector component of the phase currents.

Also proposed is a computer program downloadable from a communication network and/or stored on a computer-readable medium, characterised in that it comprises instructions for the execution of the steps of a control method according to the invention, when said program is executed on a computer.

Also proposed is a control device for a rectifier connected to phases of a synchronous electric generator with permanent magnets in order to provide a direct current voltage, the phases being designed to have phase currents flowing through them when the electric generator is driven, the control device comprising:

a module designed to determine a first setpoint of a first vector component of the phase currents along a first axis of a rotating reference frame linked to a rotor of the electric generator, and a second setpoint of a second vector component of the phase currents along a second axis of the rotating reference frame, this second vector component of the phase currents being intended to drive a defluxing of the rotor; and a module for controlling the rectifier on the basis of the first and second setpoints of the vector components of the phase currents;

characterised in that the first setpoint of the first vector component of the phase currents is determined from an external feedback loop designed to feedback-control a voltage of a direct current bus or to regulate a current from a battery connected to the direct current bus, and in that the module is further designed to:

determining a first theoretical setpoint of the first vector component of the phase currents;

determining a second theoretical setpoint of the second vector component of the phase currents; and if a magnitude of a vector sum of the setpoints of the vector components of the phase currents is less than or equal to a predefined threshold, providing theoretical setpoints as the setpoints of the vector components of the phase currents; and otherwise, limiting the first theoretical setpoint and/or the second theoretical setpoint so that a magnitude of a vector sum of the theoretical setpoints is less than or equal to the predefined threshold, and providing theoretical setpoints after limiting the vector components of the phase currents as setpoints.

BRIEF DESCRIPTION OF THE FIGURES

The invention will be better understood with the aid of the following description, given only by way of example and made with reference to the attached drawings in which.

DETAILED DESCRIPTION OF THE INVENTION

Figure 1:
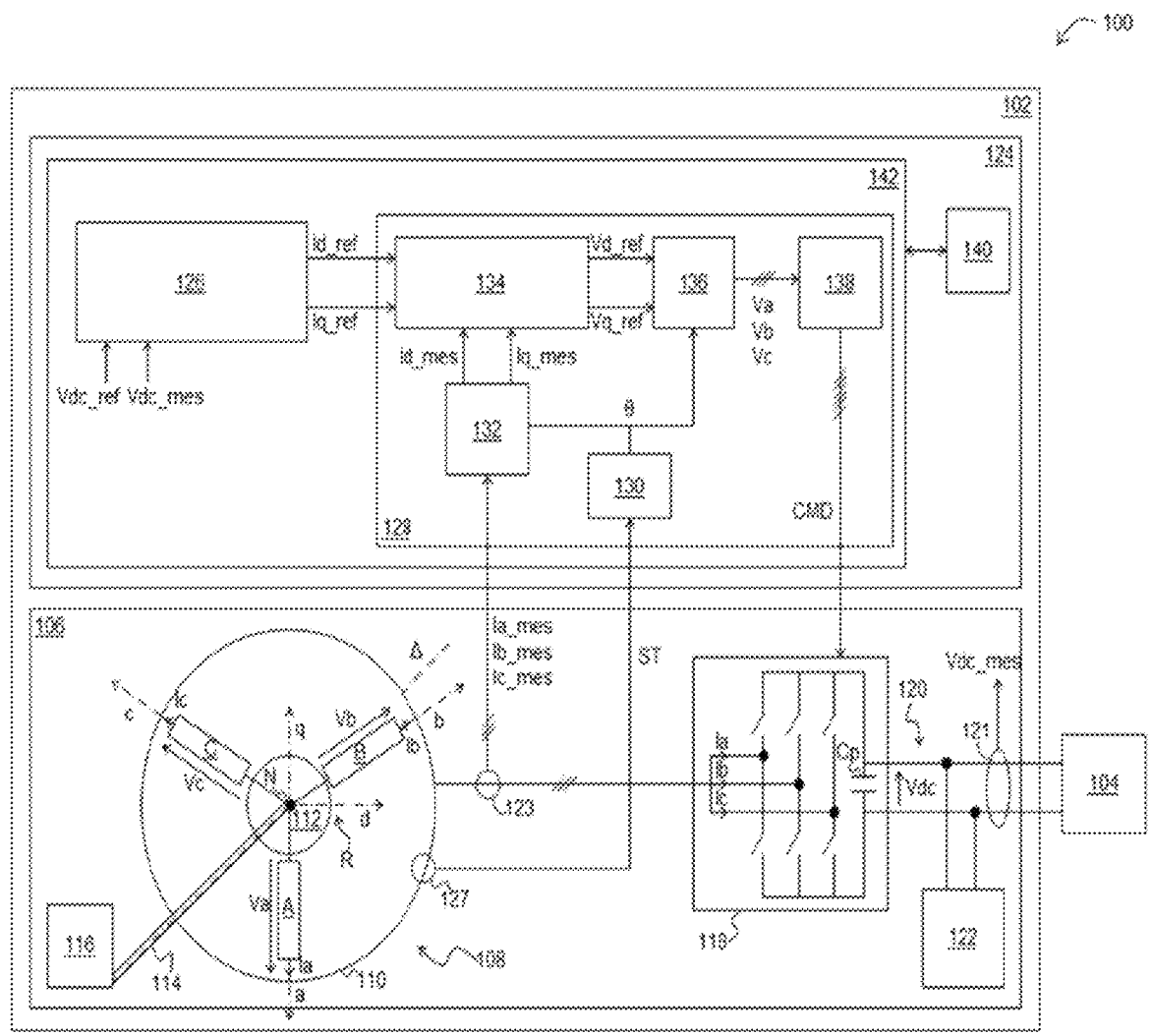
FIG. 1 is a schematic representation of an electrical installation according to a non-limiting example of implementation of the invention, comprising a rectifier connected to an electric generator, as well as a control device for the rectifier.

With reference to FIG. 1, a non-limiting example of electrical installation 100 implementing the invention will now be described.

The electrical installation 100 is for example designed to be part of an aircraft, in particular a VTOL (vertical take-off and landing) aircraft.

The electrical installation 100 comprises a power supply system 102 and a load 104 powered by the power supply system 102. For example, the load 104 comprises various aircraft items of equipment.

The power supply system 102 comprises an electrical generation chain 106 comprising firstly a synchronous electric machine 108 with permanent magnets, designed to operate as a generator. The electric generator 108 comprises a stator 110 and a rotor 112 designed to be driven in rotation relative to the stator 110, about an axis of rotation Δ. The rotor 112 comprises one or more permanent magnets (not shown) designed to generate a rotor magnetic field along an axis d, referred to as direct axis, attached to the rotor 112. The electric generator 108 further has an input shaft 114 secured to the rotor 112. In order to drive the rotor 112 in rotation, the electrical generation chain 106 further comprises, in the example described, a gas turbine 116 connected to the input shaft 114.

In the example described, the electric generator 108 is multi-star (in this case two stars) and each star is three-phase star with a single neutral. For the sake of clarity, only one star is shown in FIG. 1. The person skilled in the art will appreciate that the invention applies, in general, to a synchronous electric machine with multi-star (i.e., the number of stars is greater than or equal to 1) and multi-phase (i.e., the number of phases per star is greater than or equal to 3) permanent magnets. The stator 110 comprises three phases A, B, C whose magnetic axes are oriented respectively in three directions a, b, c transverse to the axis of rotation Δ of the rotor 112 and intersecting on this axis of rotation Δ. The electric generator 108 is preferably balanced so that the three directions a, b, c are separated from each other by an angle of 120°. The three phases A, B, C have respective first ends connected together to a single neutral point N.

During the rotation of the rotor 112, the phases A, B, C are designed to have phase currents Ia, Ib, Ic flowing through them, generating magnetic fields in the three directions a, b, c respectively.

Furthermore, during operation of the electric generator 108, the phases A, B, C have respective phase voltages with respect to the neutral point N, noted Va, Vb, Vc.

As will be described in more detail later, the electric generator 108 is designed to be vector-controlled. Thus, each phase current Ia, Ib, Ic is associated with a phase current vector having a magnitude equal to the phase current Ia, Ib, Ic and extending in the direction a, b, c of the phase A, B, C through which this phase current Ia, Ib, Ic flows. The phase currents Ia, Ib, Ic are thus expressed in a reference frame formed by the axes a, b, c, referred to as the reference frame abc. The phase currents Ia, Ib, Ic are therefore globally represented by a global vector of phase current equal to the vector sum of the phase current vectors.

To simplify control by using substantially continuous quantities rather than directly the alternating phase currents Ia, Ib, Ic, the global vector of phase current is expressed in a rotating reference frame R attached to the rotor 112 and comprising the direct axis d and a quadrature axis q, perpendicular to the direct axis d in the case where the rotor 112 has a single north-south pole pair. In general, the invention applies to a rotor with a number of pole pairs greater than or equal to one. Thus, the global vector of phase current is expressed by two components: a direct component Id along the direct axis d and a quadrature component Iq along the quadrature axis q. In this way, the phase currents Ia, Ib, Ic are represented by the components Id, Iq. To change from the phase currents Ia, Ib, Ic to the components Id, Iq, the Park transform or the dqo transform can be used. The transition from the components Id, Iq to the phase currents Ia, Ib, Ic is done for example by means of inverse transforms.

Similarly, the phase voltages Va, Vb, Vc in the reference frame abc are represented by direct Vd and quadrature Vq components in the rotating reference frame R.

In order to convert the phase voltages Va, Vb, Vc into a voltage that can be applied to the load 104, the electrical generation chain 106 further comprises a rectifier 118 designed to convert the phase alternating voltages Va, Vb, Vc into a direct current voltage Vdc. The rectifier 118 comprises, for each phase voltage Va, Vb, Vc, a respective switching arm comprising a high-side switch and a low-side switch connected to each other at a middle point to which the phase voltage Va, Vb, Vc under consideration is applied and receiving the phase current Ia, Ib, Ic of this phase A, B, C.

The electrical generation chain 106 also comprises a bus 120 comprising two power lines (positive and negative respectively) between which the switching arms of the rectifier 118 are connected and distributing the direct current voltage Vdc to the various items of equipment forming the load 104. The bus 120 is generally referred to as HVDC bus (High Voltage Direct Current) and the direct current voltage Vdc that it carries is generally a high voltage, i.e., equal to 540 V (standard voltage in aeronautics), or even higher to 540 V. To smooth the direct current voltage Vdc, the rectifier 118 preferably comprises a capacitor Cp between the power lines of the bus 120.

In the example described, the electrical generation chain 106 further comprises a battery 122 connected to the bus 120 to participate in the generation of the direct current voltage Vdc. The battery 122 has a state of load that varies over time and therefore influences the direct current voltage Vdc of the bus 120.

The rectifier 118 is sometimes referred to as active rectifier in that it is designed to be controlled so that the direct current voltage Vdc on the bus 120 can be maintained close to a setpoint Vdc_ref despite the variations in the load of the battery 122 and the phase voltages Va, Vb, Vc. This setpoint Vcd_ref can be varied over time, according to the needs of the items of equipment forming the load 104.

In addition, the rectifier 118 may also be used to maintain a current Ibat in the battery 122 substantially equal to a current setpoint Ibat_ref regardless of the variations in the voltage Vdc and the phase voltages Va, Vb, Vc.

Thus, in order to drive the rectifier 118, the electrical generation chain 106 further comprises a measuring device 121 designed to provide a measurement Vdc_mes of the direct current voltage Vdc, a measuring device 123 designed to provide respective measurements Ia_mes, Ib_mes, Ic_mes of the phase currents Ia, Ib, Ic and a measuring device 127 designed to provide a measurement ST of a state of the electric generator 108.

In particular, the measuring device 127 may be, for example, a position sensor, such as a resolver, which directly measures the angular position information of the rotor 112 or a synchronous generator mounted on the shaft of the electric generator 106 and rotating at no load. In this case, the angular position of the rotor 112 is deduced from measurements of its no-load electromotive forces.

In addition, the power supply system 102 comprises a control device 124 for the rectifier 118 more specifically designed to provide respective switching commands CM D to the switches of the rectifier 118, in order to connect each phase A, B, C alternately to the positive line and the negative line of the bus 120.

The control device 124 firstly comprises a module 126 designed to determine a setpoint Id_ref of the direct component Id of the phase currents Ia, Ib, Ic and a setpoint Iq_ref of the quadrature component Iq of the phase currents Ia, Ib, Ic.

Different possible embodiments of the module 126 will be described later with reference to FIGS. 2, 4, 6 and 8.

The control device 124 further comprises a module 128 for controlling the rectifier 118 on the basis of the setpoints Iq_ref, Id_ref.

The module 128 comprises a module 130 designed to determine an angular position θ of the rotor 112 from the measurement ST of the state of the electric generator 108.

The module 128 further comprises a module 132 designed to convert, from the angular position θ of the rotor 112, the measurements Ia_mes, Ib_mes, Ic_mes into measurements Id_mes, Iq_mes in the rotating reference frame R. The module 132 uses, for example, the Park transform, the dqo transform or the Fortescue transform generalized to a given number of phases.

The module 128 further comprises a module 134 designed to determine setpoints Vd_ref, Vq_ref of the direct and quadrature components Vd, Vq of the phase voltages Va, Vb, Vc, from the setpoints Id_ref, Iq_ref and the measurements Id_mes, Iq_mes. The setpoints Vd_ref, Vq_ref thus form a vector setpoint of the phase voltages Va, Vb, Vc. The module 134 is, for example, designed to determine an error from a difference between the setpoints Id_ref, Iq_ref and the measurements Id_mes, Iq_mes and to use correctors, for example proportional integral correctors, to determine the setpoints Vd_ref, Vq_ref from the error.

The module 128 further comprises a module 136 designed to convert, from the angular position θ, the setpoints Vd_ref, Vq_ref into setpoints Va_ref, Vb_ref, Vc_ref in the reference frame abc. The module 136 uses, for example, the inverse Park transform, the inverse dqo transform or the Fortescue transform generalized to a given number of phases.

The module 128 further comprises a module 138 designed to determine the switching commands CMD of the switches of the rectifier 118 from the setpoints Va_ref, Vb_ref, Vc_ref.

In the example described, the control device 124 comprises a computer system comprising a processing unit 140 (such as a microprocessor) and a memory 142 (such as a main memory) in which is stored a computer program containing computer program instructions designed to be executed by the processing unit 140. Thus, the modules described above are implemented in the example described in the computer program as software modules.

Alternatively, some or all of the modules could be implemented as hardware modules, i.e., in the form of an electronic circuit, e.g., micro-wired, not involving a computer program.

Figure 2:
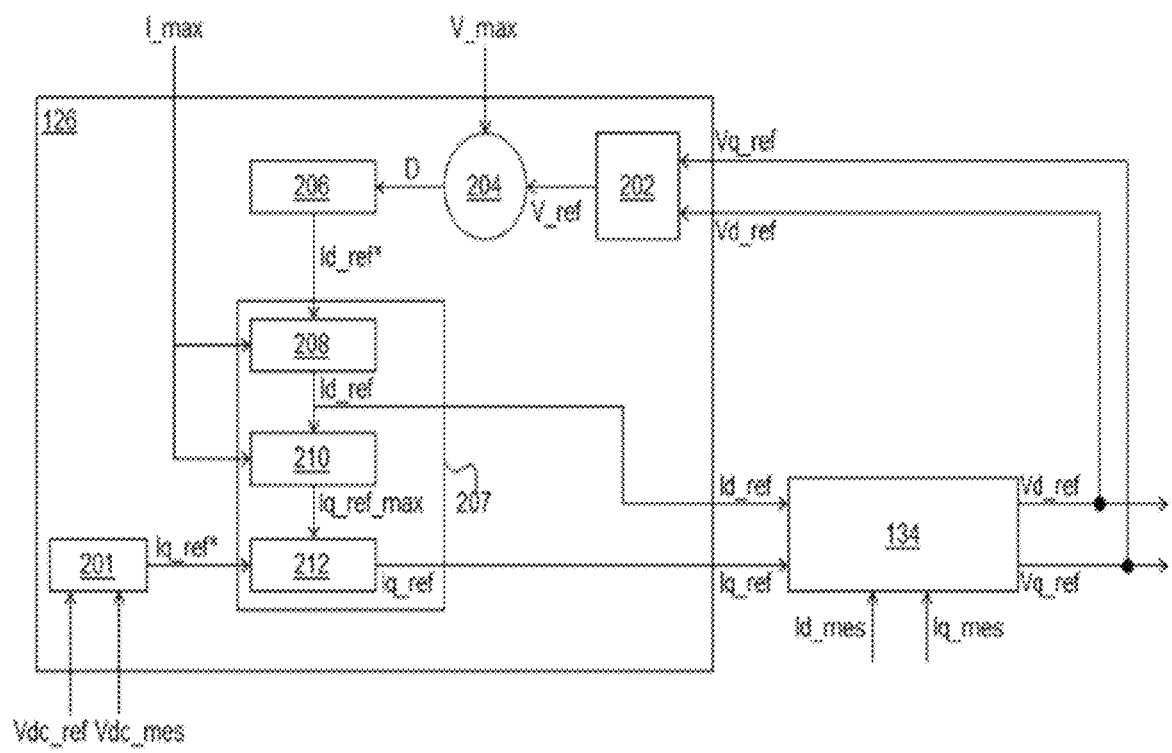
FIG. 2 is a schematic representation of modules of the control device of FIG. 1, according to a first example of embodiment.

With reference to FIG. 2, a first example of embodiment of the module 126 will now be described in more detail.

The module 126 firstly comprises a module 201 designed to determine a theoretical setpoint Iq_ref* of the quadrature component Iq of the phase currents Ia, Ib, Ic, from the measurement Vdc_mes and the setpoint Vdc_ref. For example, the theoretical setpoint Iq_ref* is determined by the equation:

$$Iq^*_{-ref} = (V^2_{dc\_ref} - V^2_{dc\_mes}) \times \left(Kp + \frac{Ki}{s}\right) \qquad \text{[Math. 1]}$$

where s is the Laplace operator, Kp is a proportional action gain and Ki is an integral action gain.

The module 126 further comprises a module 202 designed to determine a magnitude V_ref of the vector setpoint of the phase voltages. In the example described where the vector setpoint of the phase voltages expressed in the rotating reference frame R by the components Vd_ref, Vq_ref, the module 202 is for example designed to determine the magnitude V_ref according to the following equation:

$$V\_ref = \sqrt{Vd\_ref^2 + Vq\_ref^2} \qquad \text{[Math. 2]}$$

The module 126 further comprises a module 204 designed to determine a difference D between the magnitude V_ref and a threshold V_max corresponding to a maximum permissible voltage for the electric generator 108 defined for a given measured direct current voltage Vdc_mes and a given modulation strategy used by the module 138. For example, the module 204 is designed to determine the difference D according to the following equation:

$$D = V\_max - V\_ref \qquad \text{[Math. 3]}$$

The module 126 further comprises a module 206 designed to receive the difference D and to determine, from this difference D, a theoretical setpoint Id_ref* of the direct component Id of the phase currents Ia, Ib, Ic.

More precisely, if this difference D is negative, i.e. if the magnitude V_ref is greater than the threshold V_max, then the electric generator 108 must be controlled in defluxing mode and the module 206 is then designed to provide a non-zero theoretical setpoint Id_ref* intended to drive a defluxing of the rotor 112, i.e. to drive the generation of a defluxing magnetic field along the direct axis d which opposes the magnetic field produced by the rotor 112 along the direct axis d. In the example described, the electric generator 108 is modelled in motor convention, so that the theoretical setpoint Id_ref* is negative to obtain the defluxing magnetic field. For example, the module 206 uses a proportional integrator to determine the theoretical setpoint Id_ref*. In particular, this integrating proportional corrector can be applied to D according to the equation:

$$I\_d^*_{ref} = D \times \left(Kp + \frac{Ki}{s}\right) \qquad \text{[Math. 4]}$$

where s is the Laplace operator, Kp is the gain of the proportional action and Ki is the gain of the integral action.

If the magnitude V_ref is less than or equal to the predefined threshold V_max (positive or zero difference D), then the electric generator 108 does not need to be controlled in defluxing mode and the module 206 is then designed so that the theoretical setpoint Id_ref* is positive or zero.

The module 126 further comprises a module 207 designed to determine the setpoints Iq_ref, Id_ref by limiting the theoretical setpoint Iq_ref* and/or the theoretical setpoint Id_ref* if necessary.

More precisely, the module 207 is firstly designed to limit the theoretical setpoint Id_ref* so that it does not risk driving the generation of a magnetic field along the direct axis d in addition to the magnetic field produced by the rotor 112 along the direct axis d. With the conventions used in the example described, the module 207 is designed to prevent the setpoint Id_ref from being positive by limiting the theoretical setpoint Id_ref* to zero.

The module 207 is further designed to prevent the setpoint Iq_ref from being positive by limiting the theoretical setpoint Iq_ref* to zero. Indeed, according to the convention adopted, the operation in generator mode of the electric machine requires a negative current Iq.

The module 207 is further designed to limit the theoretical setpoint Iq_ref* and/or the theoretical setpoint Id_ref* so that the magnitude of their vector sum after limitation remains less than or equal to a threshold I_max. This threshold I_max corresponds, for example, to a maximum current supported by the power electronics, in particular the switches of the rectifier 118.

The module 207 is then designed to provide the theoretical setpoints Iq_ref*, Id_ref* after limitation as setpoints Iq_ref, Id_ref.

In the example described, in order to produce these different limitations of the theoretical setpoints Iq_ref*, Id_ref*, the module 207 firstly comprises a module 208 designed to limit the negative magnitude of the theoretical setpoint Id_ref* to the threshold−I_max and its positive magnitude to zero. Thus, the setpoint Id_ref is equal to the theoretical setpoint Id_ref* except when, on the one hand, the magnitude of the latter falls below the threshold−I_max, in which case the setpoint Id_ref is equal to −I_max, and, on the other hand, the theoretical setpoint Id_ref* is greater than zero, in which case the setpoint Id_ref is equal to zero. In particular, when the defluxing is not required (difference D greater than or equal to zero), the setpoint Id_ref is zero.

The module 207 further comprises a module 210 designed to determine a threshold Iq_ref_max of the setpoint Iq_ref, from the setpoint Id_ref and the threshold I_max, for example according to the equation:

$$Iq\_ref\_max = \sqrt{I\_max^2 - Id\_ref^2} \qquad \text{[Math. 5]}$$

The module 207 further comprises a module 212 designed to limit the negative magnitude of the theoretical setpoint Iq_ref* to the threshold−Iq_ref_max and its positive magnitude to zero.

Figure 3:
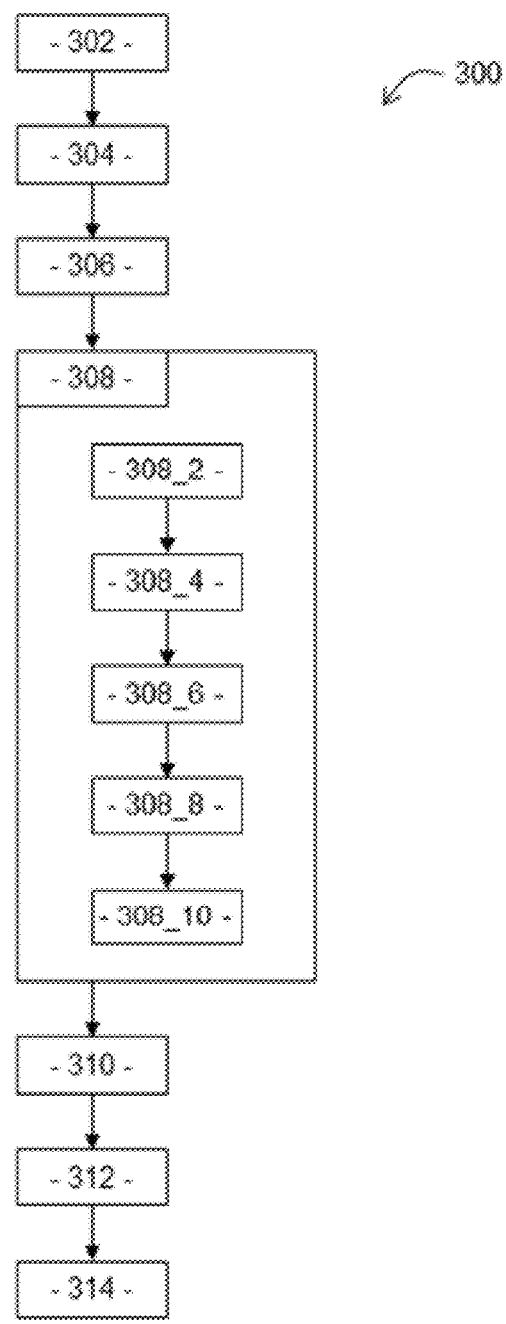
FIG. 3 is a block diagram illustrating steps in a method for controlling the rectifier of the electrical installation of FIG. 1 with the control device of FIG. 2.

With reference to FIG. 3, a first example of method 300 for controlling the rectifier 118 will now be described. In the example described, the method 300 is implemented by the control device 124, with the module 126 of FIG. 2. Furthermore, the person skilled in the art will appreciate that the steps of the method 300 described may be executed in a different order from that shown in FIG. 3 and may be executed, for example, concurrently.

In a step 302, the control device 124 receives the measurements Vdc_mes, Ia_mes, Ib_mes, Ic_mes, ST and Ibat_mes.

In a step 304, the module 130 determines the angle of rotation θ of the rotor 112 from the measurement ST of the state of the electric generator 108.

In a step 306, the module 132 converts, from the angular position θ of the rotor 112, the measurements Ia_mes, Ib_mes, Ic_mes into measurements Id_mes, Iq_ref in the rotating reference frame R.

In a step 308, the module 126 determines the phase current setpoints Iq_ref, Id_ref.

To this end, in a step 308_2, the module 201 determines the theoretical setpoint Iq_ref* from an external feedback loop for feedback-controlling the bus voltage 120 or for regulating the current of the battery 122, i.e., for example, from the measurement Vdc_mes and the setpoint Vdc_ref of the direct current voltage Vdc or from the measurement Ibat_mes of the battery current and the battery current setpoint Ibat_ref.

In a step 308_4, the module 202 determines the magnitude V_ref of the vector setpoint of the phase voltages from the setpoints Vq_ref, Vd_ref.

In a step 308_6, the module 204 determines the difference D between the magnitude V_ref and the threshold V_max.

In a step 308_8, the module 206 determines, from the difference D, the theoretical setpoint Id_ref*.

In a step 308_10, the module 207 limits if necessary the theoretical setpoint Id_ref* and/or the setpoint Iq_ref* to provide the setpoints Iq_ref, Id_ref. The current value Id required to reach a given operating point is therefore limited, resulting in lower current magnitudes Ia, Ib and Ic and, consequently, less thermal losses in the power electronics and the electric machine.

Advantageously, the setpoints Iq_ref and Id_ref are obtained in the step 308 independently of operating parameters of the electric generator 108, in particular independently of a torque and a rotational speed of the rotor 112 and without using a torque setpoint of the rotor 112. In addition, in general, the operating parameters of the electric generator 108 may refer to electrical parameters, such as an inductance matrix, and mechanical parameters, such as the rotational speed of the rotor 112.

In addition, it will be appreciated that the setpoint Id_ref is obtained by feedback regulation.

In a step 310, the module 134 determines the setpoints Vd_ref, Vq_ref from the setpoints Id_ref, Iq_ref and the measurements Id_mes, Iq_mes.

In a step 312, the module 136 converts the setpoints Vd_ref, Vq_ref into setpoints Va_ref, Vb_ref, Vc_ref in the reference frame abc.

In a step 314, the module 138 determines the switching commands CMD and provides them to the switches of the rectifier 118, so that the direct current voltage Vdc approaches the reference voltage Vdc_ref.

Figure 4:
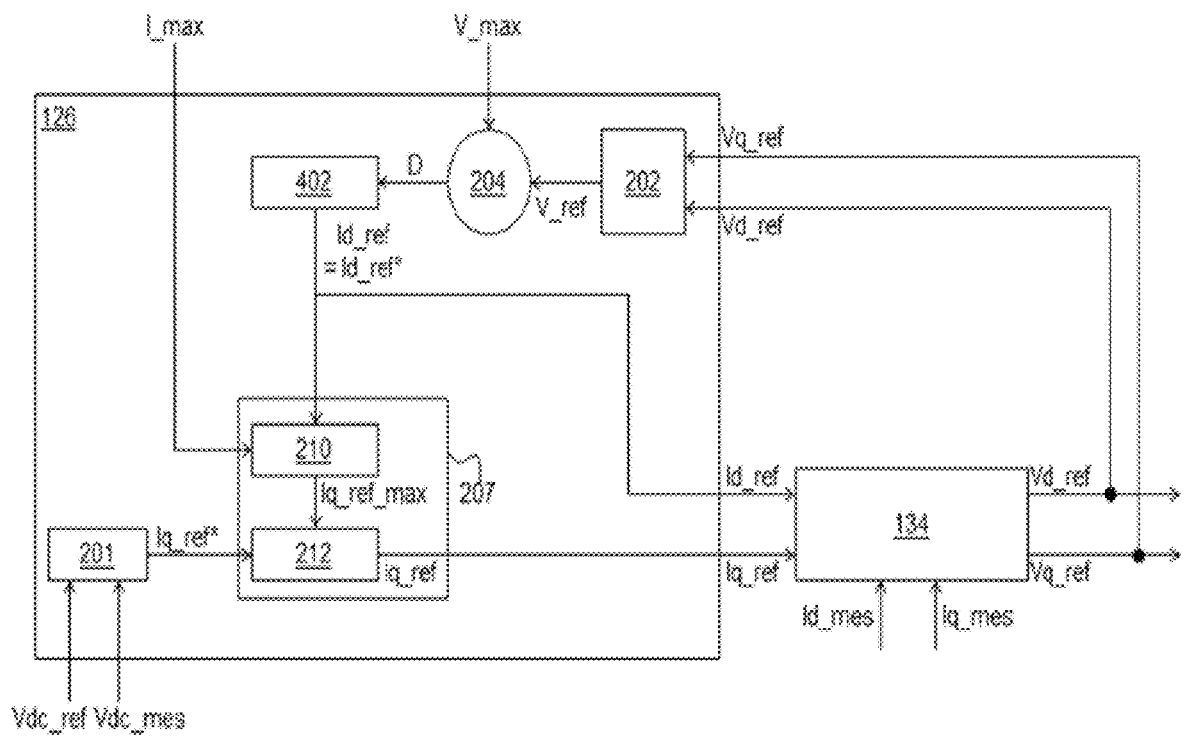
FIG. 4 is a schematic representation of modules of the control device of FIG. 1, according to a second example of embodiment.

With reference to FIG. 4, a second example of embodiment of the module 126 will now be described in more detail.

This example is similar to that of FIG. 2, except that the module 206 is replaced by a module 402 designed to provide, when the difference D is negative, i.e. when the magnitude V_ref is greater than the threshold V_max, a setpoint Id_ref equal to a predefined constant, noted Id_ref°. This constant Id_ref° is chosen to be lower in absolute value than the threshold I_max. When the difference D is positive or zero, the module 402 is designed to provide the setpoint Id_ref equal to zero. It will be appreciated that the difference D is only used to determine the need to activate or not the defluxing. Its precise value is not used in this embodiment, just its sign. Thus, module 204 could provide the module 402 with a binary instead of the difference D, simply indicating whether or not defluxing is activated.

Moreover, with the choice of the constant Id_ref° lower (in absolute value) than the threshold I_max, the module 207 is simplified and no longer comprises the module 208. In addition, the module 207 limits only the theoretical setpoint Iq_ref* if necessary, and not the setpoint Id_ref which remains constant. Finally, the person skilled in the art will appreciate that, in the case where the current sensors Ia, Ib and Ic are used in receiver convention, the constant Id_ref° is negative.

Figure 5:
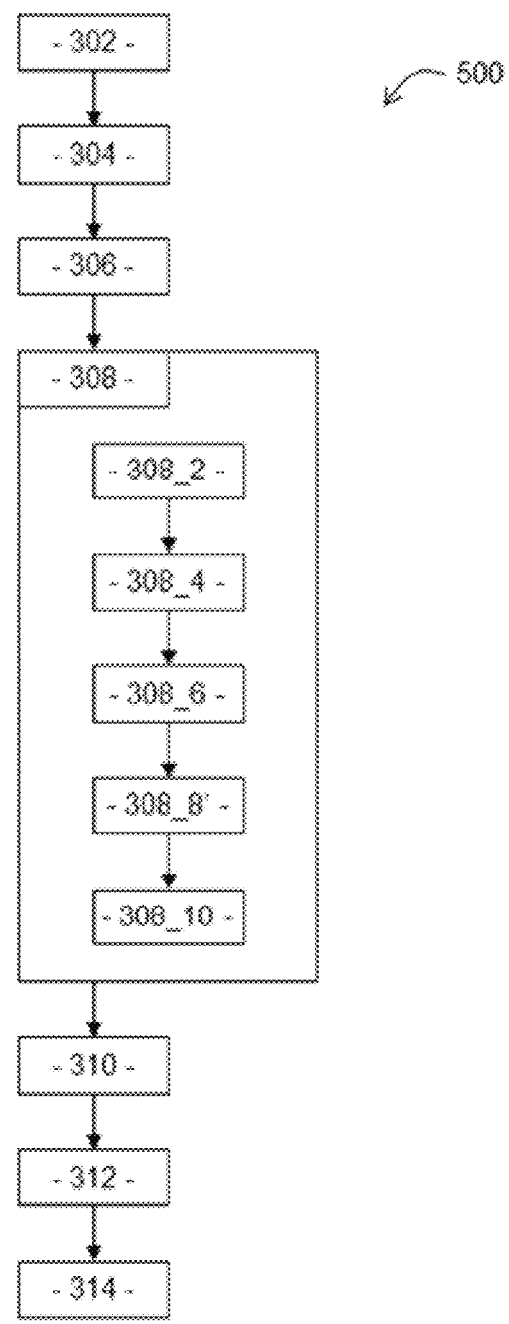
FIG. 5 is a block diagram illustrating steps in a method for controlling the rectifier of the electrical installation of FIG. 1 with the control device of FIG. 4.

With reference to FIG. 5, a second example of method 500 for controlling the rectifier 118 will now be described. In the example described, the method 500 is implemented by the control device 124, with the module 126 of FIG. 4.

The method 500 is similar to the method 300, except that step 308_8 is replaced by a step 308_8' in which the module 206 provides the setpoint Id_ref equal to zero or to the constant Id_ref°, depending on the sign of the difference D.

Figure 6:
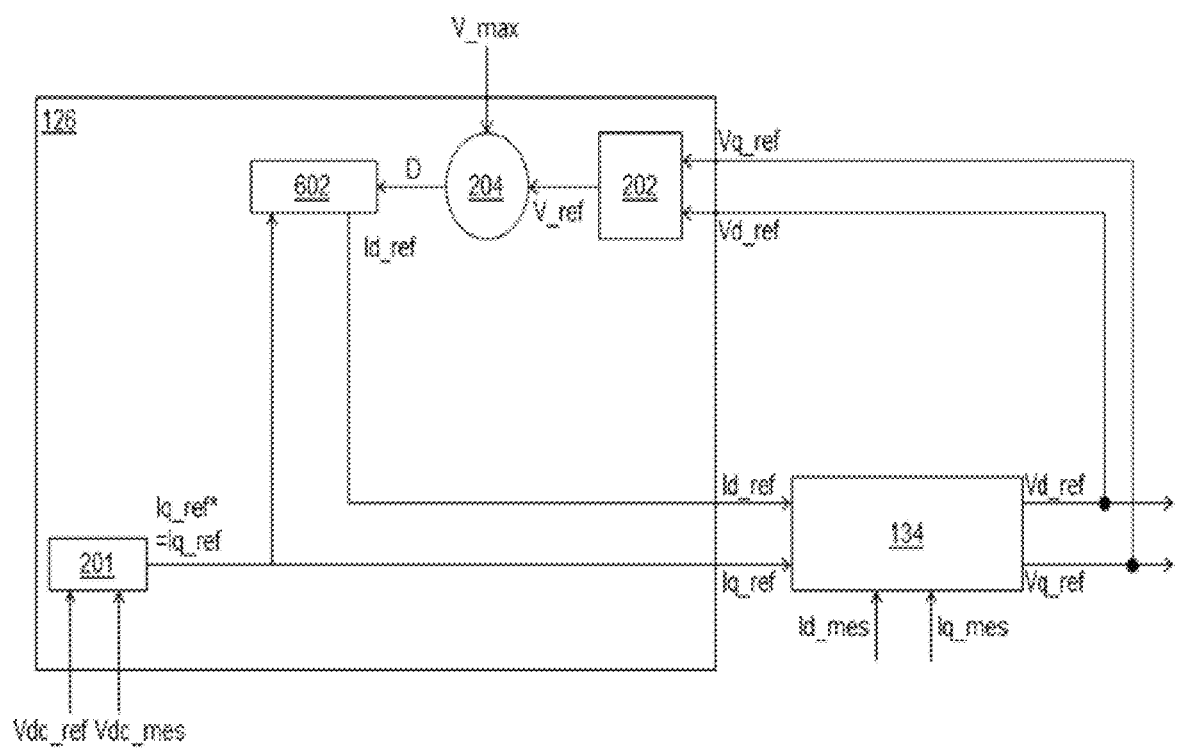
FIG. 6 is a schematic representation of modules of the control device of FIG. 1, according to a third example of embodiment.

With reference to FIG. 6, a third example of embodiment of the module 126 will now be described in more detail.

In this third example, the setpoint Id_ref is determined from the setpoint Iq_ref, using a feedforward regulation.

More precisely, the modules 206 and 207 are replaced by a module 602 designed to provide, when the difference D is negative, a setpoint Id_ref determined by means of a table associating setpoint values Id_ref with values of the setpoint Iq_ref, such as the following table:

TABLE 1

| Active power P [kW] | Iq_ref [A] | Id_ref [A] |
|---|---|---|
| 0 ≤ P ≤ −20 | 0 ≤ Iqref ≤ −40 | −30 |
| −20 < P ≤ −40 | −40 < Iqref ≤ −75 | −40 |
| −40 < P ≤ −60 | −75 < Iqref ≤ −110 | −50 |
| −60 < P ≤ −80 | −110 < Iqref ≤ −140 | −60 |
| −80 < P ≤ −90 | −140 < Iqref ≤ −160 | −75 |
| −90 < P ≤ −95 | −160 < Iqref ≤ −178 | −90 |

Thus, in the example described, ranges of contiguous values of Iq_ref are respectively associated with values of Id_ref. In this table, the associated setpoints Iq_ref, Id_ref are all chosen so that the magnitude of their vector sum is less than I_max.

In addition, in the particular case of a synchronous machine with smooth poles, the current Iq is directly proportional to the active power P and the range of variation of the current setpoint Iq_ref is thus directly deduced from the range of variation of the active power.

When the difference D is positive or zero, the module 602 is designed to provide the setpoint Id_ref equal to zero. Again, only the sign of the difference D is used by the module 602.

Figure 7:
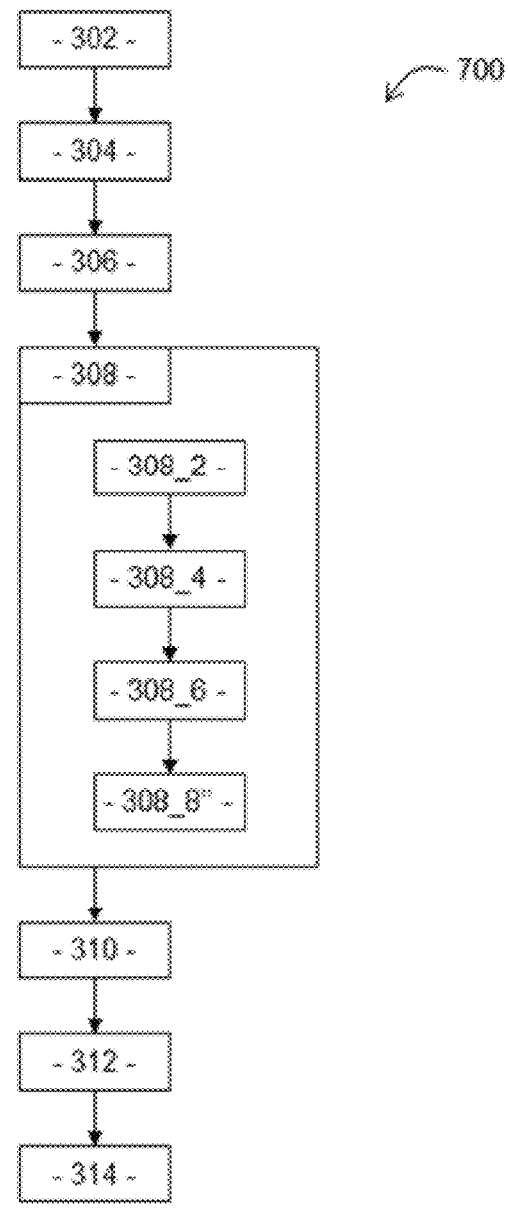
FIG. 7 is a block diagram illustrating steps in a method for controlling the rectifier of the electrical installation of FIG. 1 with the control device of FIG. 6.

With reference to FIG. 7, a third example of method 700 for controlling the rectifier 118 will now be described. In the example described, the method 700 is implemented by the control device 124, with the module 126 of FIG. 6.

The method 700 is similar to the method 500, except that the step 308_8' is replaced by a step 308_8" during which the module 602 provides the setpoint Id_ref either equal to zero or from the setpoint Iq_ref and the association table, depending on the sign of the difference D. Furthermore, the step 308_10 is omitted because the limitation of the setpoints Iq_ref, Id_ref is provided for when the association table is established.

Figure 8:
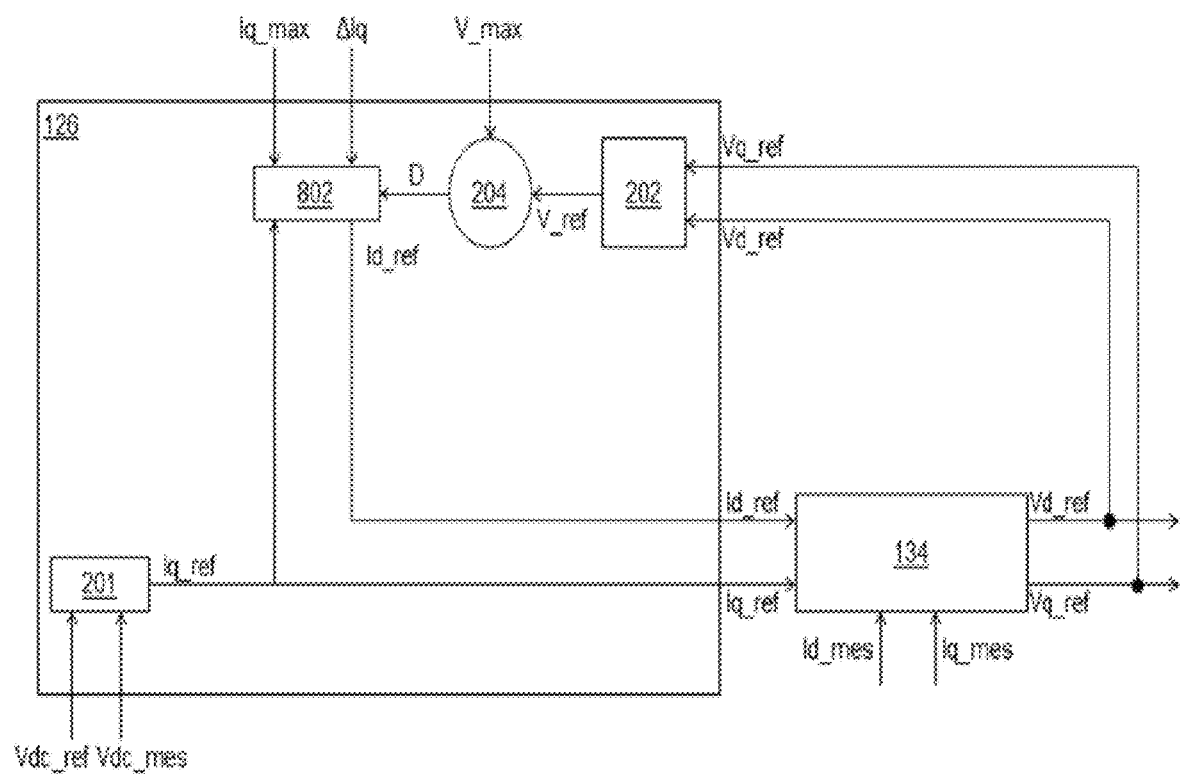
FIG. 8 is a schematic representation of modules of the control device of FIG. 1, according to a fourth example of embodiment.

With reference to FIG. 8, a fourth example of embodiment of the module 126 will now be described in more detail.

In this fourth example, the setpoint Id_ref is also determined from the setpoint Iq_ref, according to a feedforward control.

More precisely, the module 602 is replaced by a module 802 designed to provide, when the difference D is negative, a setpoint Id_ref determined by means of a function associating setpoint values Id_ref with values of the setpoint Iq_ref. For example, the function is given by the following equation:

$$Id\_ref = \sqrt{(Iq\_max - \Delta Iq)^2 - Iq\_ref^2} \qquad \text{[Math. 6]}$$

where Iq_max and ΔIq are predefined parameters taking into account in particular I_max, so that the magnitude of the vector sum of the setpoints Iq_ref and Id_ref is smaller than I_max.

When the difference D is positive or zero, the module 802 is designed to provide the setpoint Id_ref equal to zero. Again, only the sign of the difference D is used by the module 802.

Figure 9:
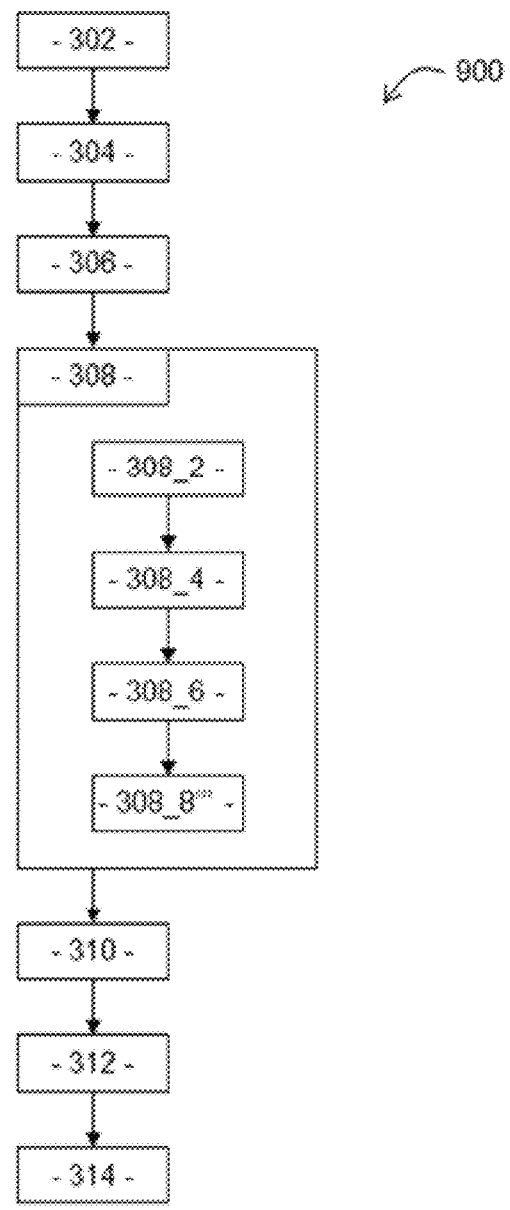
FIG. 9 is a block diagram illustrating steps in a method for controlling the rectifier of the electrical installation of FIG. 1 with the control device of FIG. 8.

With reference to FIG. 9, a fourth example of method 900 for controlling the rectifier 118 will now be described. In the example described, the method 900 is implemented by the control device 124, with the module 126 of FIG. 8.

The method 900 is similar to the method 700, except that the step 308_8" is replaced by a step 308_8'" in which the module 802 provides the setpoint Id_ref either equal to zero or from the setpoint Iq_ref and the association function, depending on the sign of the difference D.

It is clear that a control method for a rectifier such as those described above is well suited to an electric machine operating as a generator.

It should also be noted that the invention is not limited to the embodiments described above. It will be apparent to the person skilled in the art that various modifications can be made to the above-described embodiments in the light of the instruction just disclosed.

In particular, in general, the electric generator 108 may have more than three phases, divided into several stars with respective neutrals disconnected from each other. For example, in an alternative embodiment, the electric generator 108 comprises three stars of three windings (phases) each, with three respective neutrals disconnected from each other. When several stars are present, a rectifier associated with a bus is provided for each star.

In the foregoing detailed presentation of the invention, the terms used should not be interpreted as limiting the invention to the embodiments exposed in the present description, but should be interpreted to include all equivalents the anticipation of which is within the reach of the person skilled in the art by applying his general knowledge to the implementation of the teaching just disclosed.

The invention claimed is:

1. A method for controlling a rectifier connected to phases (A, B, C) of a synchronous electric generator with permanent magnets to provide a direct current voltage (Vdc), the phases (A, B, C) being designed to have phase currents (Ia, Ib, Ic) flowing through them when the electric generator is driven, the method comprising:
determining:
a first setpoint (Iq_ref) of a first vector component (Iq) of the phase currents (Ia, Ib, Ic) along a first axis (q) of a rotating reference frame (R) linked to a rotor of the electric generator, and
a second setpoint (Id_ref) of a second vector component (Id) of the phase currents (Ia, Ib, Ic) along a second axis (d) of the rotating reference frame (R), this second vector component (Id) of the phase currents (Ia, Ib, Ic) being intended to drive a defluxing of the rotor; and
controlling the rectifier from the first and second setpoints (Iq_ref, Id_ref) of the vector components (Iq, Id) of the phase currents (Ia, Ib, Ic);
characterised in that the first setpoint (Iq_ref) of the first vector component (Iq) of the phase currents (Ia, Ib, Ic) is determined from an external feedback loop designed to feedback-control a voltage of a direct current bus or to regulate a current from a battery connected to the direct current bus,
and in that the method further comprises:
determining a first theoretical setpoint (Iq_ref*) of the first vector component (Iq) of the phase currents (Ia, Ib, Ic);
determining a second theoretical setpoint (Id_ref*) of the second vector component (Id) of the phase currents (Ia, Ib, Ic); and
if a magnitude of a vector sum of the setpoints (Iq_ref, Id_ref) of the vector components (Iq, Id) of the phase currents (Ia, Ib, Ic) is less than or equal to a predefined threshold (I_max), providing the theoretical setpoints (Iq_ref*, Id_ref*) as setpoints (Iq_ref, Id_ref) of the vector components (Iq, Id) of the phase currents (Ia, Ib, Ic); and
otherwise, limiting the first theoretical setpoint (Iq_ref*) and/or the second theoretical setpoint (Id_ref*) so that a magnitude of a vector sum of the theoretical setpoints (Iq_ref*, Id_ref*) is less than or equal to the predefined threshold (I_max), and providing the theoretical setpoints (Iq_ref*, Id_ref*) after limiting the vector components (Iq, Id) of the phase currents (Ia, Ib, Ic) as setpoints (Iq_ref, Id_ref).

2. The method according to claim 1, wherein the control of the rectifier from the first and second setpoints (Iq_ref, Id_ref) comprises:
determining setpoints (Vq_ref, Vd_ref) of phase voltages (Va, Vb, Vc) of the electric generator; and
controlling the rectifier from the setpoints (Vq_ref, Vd_ref) of the phase voltages (Va, Vb, Vc);
and wherein the second setpoint (Id_ref) of the second vector component (Id) of the phase currents (Ia, Ib, Ic) is determined from the setpoints (Vq_ref, Vd_ref) of the phase voltages (Va, Vb, Vc).

3. The method according to claim 1, wherein the second setpoint (Id_ref) of the second vector component (Id) of the phase currents (Ia, Ib, Ic) is set equal to a predefined constant.

4. The method according to claim 1, wherein the second setpoint (Id_ref) of the second vector component (Id) of the phase currents (Ia, Ib, Ic) is determined from the first setpoint (Iq_ref) of the first vector component (Iq) of the phase currents (Ia, Ib, Ic).

5. The method according to claim 4, wherein the second setpoint (Id_ref) of the second vector component (Id) of the phase currents (Ia, Ib, Ic) is determined by means of a table associating values of the second setpoint (Id_ref) of the second vector component (Id) of the phase currents (Ia, Ib, Ic) to values of the first setpoint (Iq_ref) of the first vector component (Iq) of the phase currents (Ia, Ib, Ic), the vector sum of the second setpoint (Id_ref) and the first setpoint (Iq_ref) being below a predefined maximum current threshold.

6. The method according to claim 4, wherein the second setpoint (Id_ref) of the second vector component (Id) of the phase currents (Ia, Ib, Ic) is determined by means of a function associating values of the second setpoint (Id_ref) of the second vector component (Id) of the phase currents (Ia, Ib, Ic) to values of the first setpoint (Iq_ref) of the first vector component (Iq) of the phase currents (Ia, Ib, Ic), the vector sum of the second setpoint (Id_ref) and the first setpoint (Iq_ref) being below a predetermined maximum current threshold.

7. A computer program downloadable from a communication network and/or stored on a computer-readable medium, characterised in that it comprises instructions for executing the steps of a method for controlling a rectifier according to claim 1, when said program is executed on a computer.

8. A device for controlling a rectifier connected to phases (A, B, C) of a synchronous electric generator with permanent magnets in order to provide a direct current voltage (Vdc), the phases (A, B, C) being designed to have phase currents (Ia, Ib, Ic) flowing through them when the electric generator is driven, the control device comprising:
a module designed to determine:
    a first setpoint (Iq_ref) of a first vector component (Iq) of the phase currents (Ia, Ib, Ic) along a first axis (q) of a rotating reference frame (R) linked to a rotor of the electric generator, and
    a second setpoint (Id_ref) of a second vector component (Id) of the phase currents (Ia, Ib, Ic) along a second axis (d) of the rotating reference frame (R), this second vector component (Id) of the phase currents (Ia, Ib, Ic) being intended to drive a defluxing of the rotor; and
a module for controlling the rectifier on the basis of the first and second setpoints (Iq_ref, Id_ref) of the vector components (Iq, Id) of the phase currents (Ia, Ib, Ic);
characterised in that the first setpoint (Iq_ref) of the first vector component (Iq) of the phase currents (Ia, Ib, Ic) is determined from an external feedback loop designed to feedback-control a voltage of a direct current bus or to regulate a current from a battery connected to the direct current bus,
and in that the module is further designed for:
determining a first theoretical setpoint (Iq_ref*) of the first vector component (Iq) of the phase currents (Ia, Ib, Ic);
determining a second theoretical setpoint (Id_ref*) of the second vector component (Id) of the phase currents (Ia, Ib, Ic); and
if a magnitude of a vector sum of the setpoints (Iq_ref, Id_ref) of the vector components (Iq, Id) of the phase currents (Ia, Ib, Ic) is less than or equal to a predefined threshold (I_max), providing theoretical setpoints (Iq_ref*, Id_ref*) as the setpoints (Iq_ref, Id_ref) of the vector components (Iq, Id) of the phase currents (Ia, Ib, Ic); and
otherwise, limiting the first theoretical setpoint (Iq_ref*) and/or the second theoretical setpoint (Id_ref*) so that a magnitude of a vector sum of the theoretical setpoints (Iq_ref*, Id_ref*) is less than or equal to the predefined threshold (I_max), and providing theoretical setpoints (Iq_ref*, Id_ref*) after limiting the vector components (Iq, Id) of the phase currents (Ia, Ib, Ic) as setpoints (Iq_ref, Id_ref).

* * * * *